United States Patent [19]

Ito

[11] Patent Number: 5,176,923
[45] Date of Patent: Jan. 5, 1993

[54] MOLD-PRESSING APPARATUS INCORPORATING ELECTRIC SERVO MOTOR AND LINKING MECHANISM

[75] Inventor: Junichi Ito, Kaga, Japan

[73] Assignee: Ito Kogyo Kabushiki Kaisha, Kaga, Japan

[21] Appl. No.: 885,232

[22] Filed: May 20, 1992

Related U.S. Application Data

[63] Continuation of Ser. No. 754,218, Aug. 27, 1991, abandoned, which is a continuation of Ser. No. 452,344, Dec. 19, 1989, abandoned.

[30] Foreign Application Priority Data

Jul. 24, 1989 [JP] Japan .................................. 1-191086

[51] Int. Cl.⁵ ............................................. B29C 43/00
[52] U.S. Cl. ..................................... 425/150; 425/167; 425/186; 425/193; 425/411; 425/451.6
[58] Field of Search ................ 425/150, 167, 185, 186, 425/193, 195, 408, 411, 451.6

[56] References Cited

U.S. PATENT DOCUMENTS

| | | | |
|---|---|---|---|
| 2,269,758 | 1/1942 | Noronha | 425/167 |
| 3,208,373 | 9/1965 | Bachelier | 425/408 |
| 3,534,442 | 10/1970 | Mahle | 425/150 |
| 3,809,739 | 5/1974 | Gelin | 425/411 |
| 4,500,274 | 2/1985 | Cyriax et al. | 425/185 |
| 4,555,228 | 11/1985 | Nishiike et al. | 425/185 |
| 4,642,044 | 2/1987 | Ishikawa et al. | 425/451.6 |
| 4,755,124 | 7/1988 | Tanaka et al. | 425/167 |
| 4,904,173 | 2/1990 | Tanaka et al. | 425/451.6 |
| 4,938,682 | 7/1990 | Kadoriku et al. | 425/451.6 |

FOREIGN PATENT DOCUMENTS

| | | | |
|---|---|---|---|
| 60-122130 | 6/1985 | Japan | 425/451.6 |
| 61-241118 | 10/1986 | Japan | 425/150 |
| 62-32020 | 2/1987 | Japan | 425/150 |

Primary Examiner—Jay H. Woo
Assistant Examiner—Scott Bushey
Attorney, Agent, or Firm—Cushman, Darby & Cushman

[57] ABSTRACT

This invention is a novel mold-pressing apparatus for molding and pressing a material, which is provided with an electric servo motor and a pair of linking mechanisms. The electric servo motor drives the mold-pressing apparatus and rotates itself in the normal and inverse directions. The electric servo motor is numerically controlled. The driving force from the electric servo motor is transmitted to the pressing mold via the linking mechanism by a rotation to reciprocation conversion assembly. By virtue of the provision of these, the mold-pressing apparatus can very easily and effectively secure the applicable pressure and adjust the pressure-applying speed, stroke of the pressing mold, and the pressing time so that the mold operator can create a comfortable environment and improve overall efficiency of the pressing operation.

5 Claims, 10 Drawing Sheets

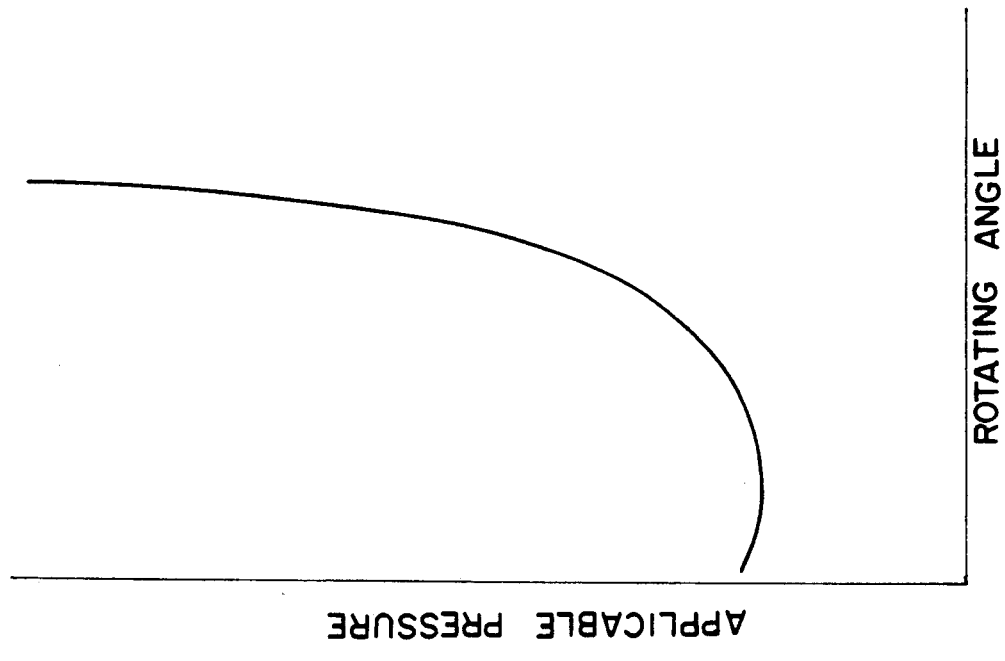
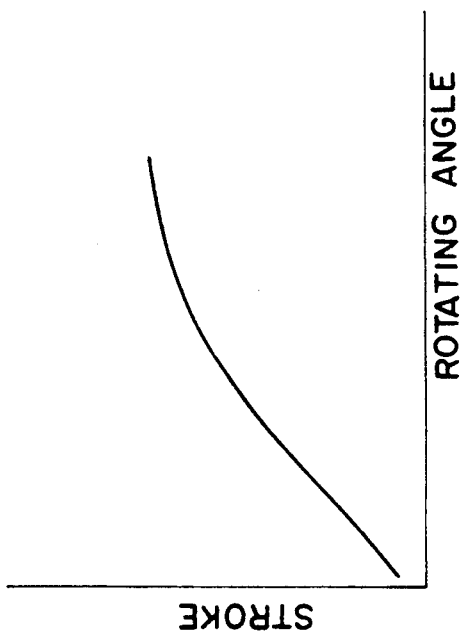
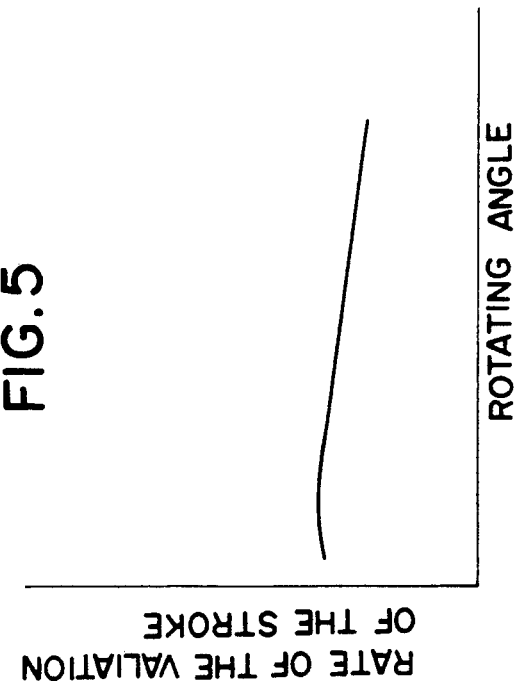

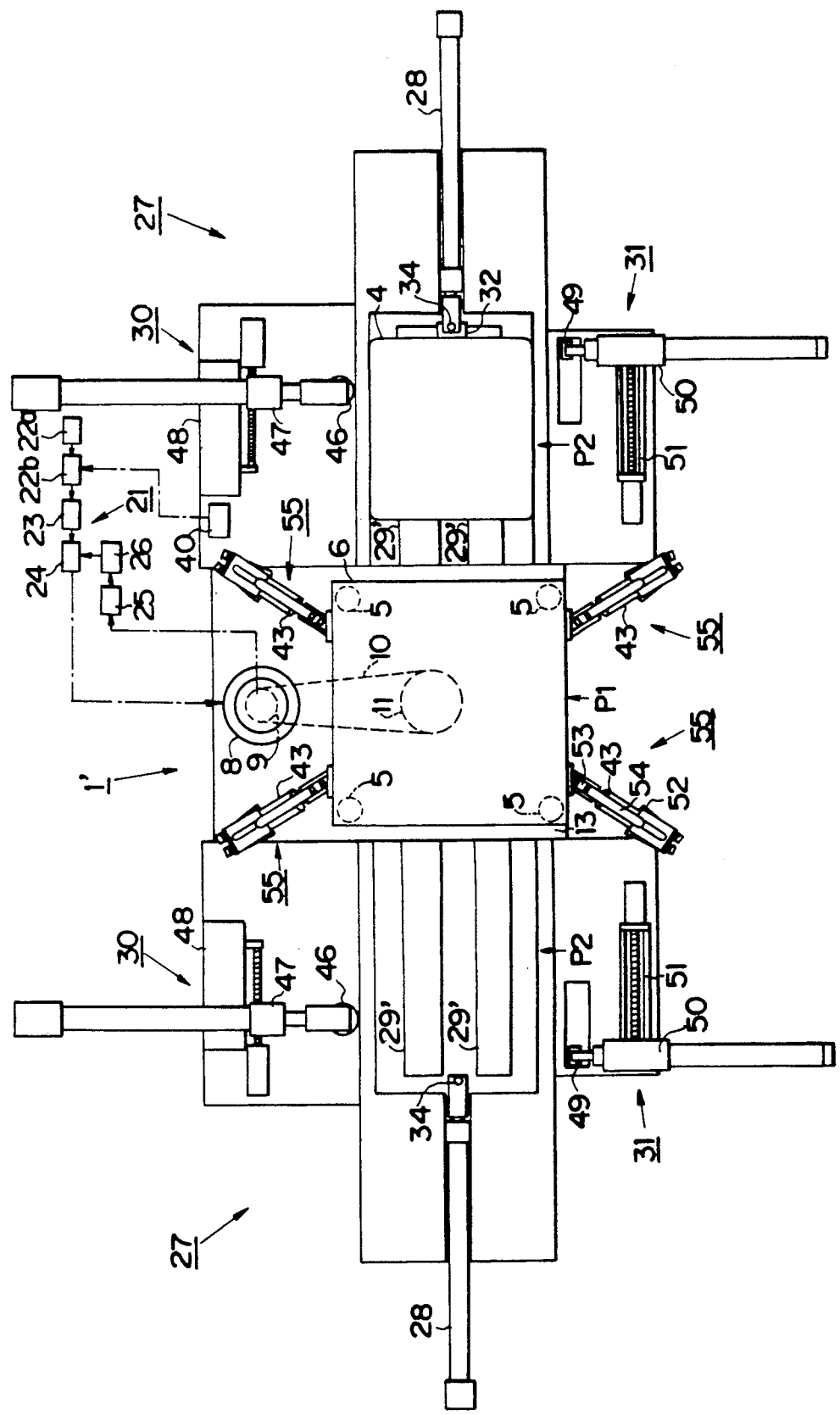

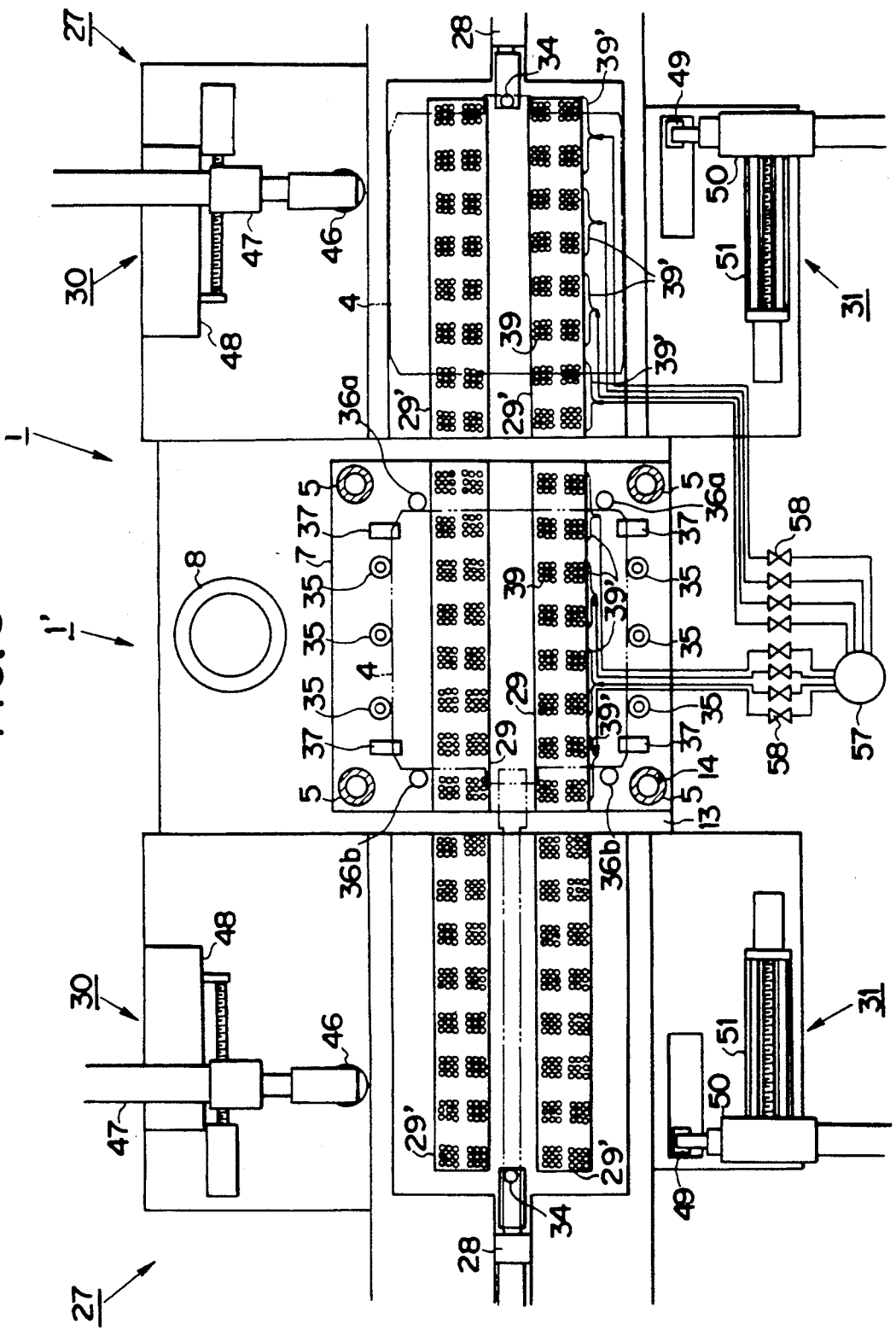

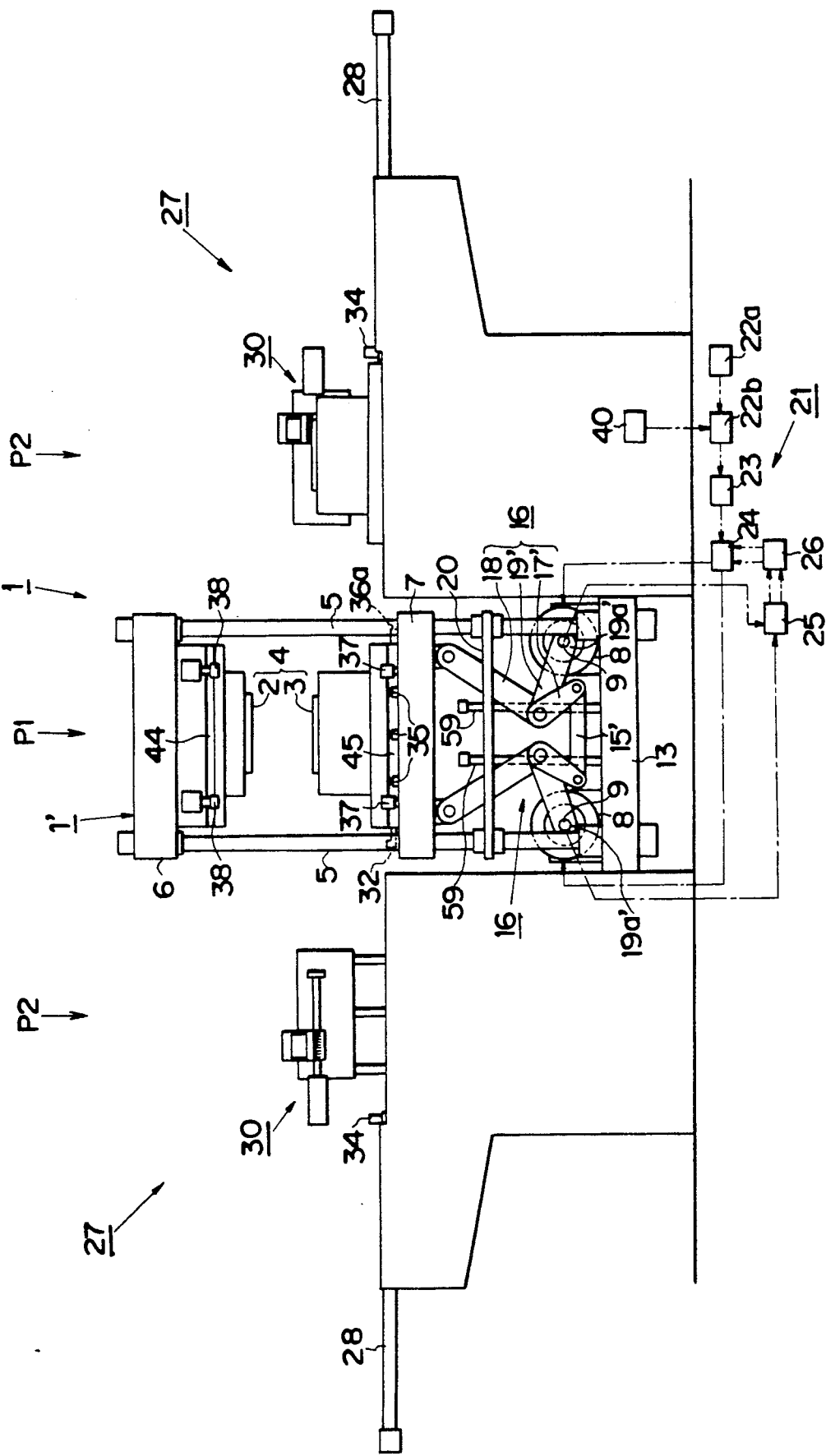

MOLD-PRESSING APPARATUS INCORPORATING ELECTRIC SERVO MOTOR AND LINKING MECHANISM

This is a continuation of application Ser. No. 07/754,218, filed on Aug. 27, 1991, which was abandoned upon the fling hereof which is a continuation of application Ser. No. 07/452,344, filed Dec. 19, 1989 now ABANDONED.

BACKGROUND OF THE INVENTION

1. Field of the Invention

The present invention relates to a mold-pressing apparatus.

2. Description of the Prior Art

As is well known, conventional mold-pressing apparatuses are widely used for in a variety of industrial applications in many fields. Each mold-pressing apparatus loads molding material like resin powder or ceramic powder, for example, in the cavity between the upper and lower molds and eventually molds the powder material into the predetermined shape by pressing and heating it in the mold.

Conventionally, mold-pressing apparatuses are widely used for manufacturing electric elements such as photoelectric conversion elements or integrated circuits. The mold of any conventional mold-pressing apparatus is composed of the upper and lower molds and is arranged so that the lower mold can be moved towards the upper mold, or conversely, the lower mold is fixed so that the upper mold can be moved toward the lower mold.

When operating any conventional mold pressing apparatus, resin powder material is applied between the upper and lower molds during the preliminary pressing process. Then the powder material is pressed and heated by the upper and lower molds. Finally the molded piece is extracted from the molded position between the upper and lower molds.

Conventionally, an oil-pressure-applied mechanism or pneumatic mechanism or a combination of these is used for driving the molding press. More particularly, an oil pressurized radial pump is used for example. Using the servo motor for controlling the output of pressurized oil from the radial pump per unit time, pressurized oil output from the radial pump is fed to the oil-pressure-applied piston for driving the pressing mold. When the pressurized mold is closed, in other words, when oil pressure is applied, pressure is intensified by decreasing the volume of pressurized oil output from the radial pump. It is possible for the pressing mold to accelerate the speed of applying pressure before and after executing the pressing operation by increasing the volume of pressurized oil output from the radial pump. The radial pump can continuously vary the volume of output oil from the positive to the negative range. The radial pump can switch the output and the intake of the pressurized oil. As a result, the clearance between the molds of the pressing mold can be fixed by reducing the volume of pressurized oil output from the radial pump. This allows the mold operator to easily adjust the stroke and pressing time of the pressing mold. In particular, the ease of adjusting the pressing time is extremely important for the molding press which simultaneously applies pressing and heating processes.

PROBLEMS TO BE SOLVED BY THE INVENTION

Any mold-pressing apparatuses using conventional oil-pressurizing art can easily maintain the applied pressure and adjust the pressing time, and also, the operator can easily adjust the stroke and pressing time.

Nevertheless, when operating such a conventional oil-pressuring apparatus, due to variation of the oil pressure, heat is generated in the pressurized oil. If this happens, heat propagates to the surrounding atmosphere. As a result, temperature around the molding press quickly rises, thus causing the working environment to become extremely uncomfortable. There are cases in which pressurized oil leaks from the radial pump, oil-pressure-applied piston, and interlinking pipes. The leaked oil often stains the molding press itself and surrounding areas. In an extreme case, there is a fire hazard from the pressurized oil. Furthermore, since the conventional radial pump is constantly operated regardless of the output of pressurized oil, it is difficult for the conventional system to suppress noise from the radial pump. Generally, when using oil pressure for driving any conventional molding press, environmental conditions at the pressing site cannot easily be improved.

There are a variety of products that can be manufactured by the molding process. Likewise, there is an increasing demand for manufacturing many kinds of merchandise in small-quantity lots. To satisfy these requirements, it is necessary for the manufacturers to finely control the pressure, pressure-intensifying speed, pressing time, and the stroke of the pressing mold according to the specific product desired. Furthermore, the manufacturers can precisely control the molding process by applying numerical controllers more frequently. The mold operator can easily control the applicable pressure, the pressure-applying speed and the pressure-applying time of the pressing mold by numerically controlling the output-volume-controlling servo motor of the radial pump. However, the stroke of the pressing mold is determined by the volume of pressurized oil inside of the piston.

The volume of pressurized oil inside of the piston is substantially the accumulation of the volume of pressurized oil output from the radial pump. Nevertheless, since the volume of pressurized oil output from the radial pump is continuously adjusted by the output-volume controlling servo motor, it is difficult to precisely determine the volume of pressurized oil output from the radial pump. In particular, it is quite difficult and expensive to manufacture a device to accurately measure the volume of oil pumped by the pump. If time-based error occurs while adjusting the volume of oil output from the output-volume controlling servo motor, the calculated cumulative result of the volume of output oil will significantly differ from the actual value.

Even using a numerical controller, with any conventional mold-pressing apparatus which uses oil pressure, it is quite difficult for any manufacturer to achieve very precise adjustment of the stroke of the pressing mold as per the requirements.

Conventionally, when performing the molding process, the pressing process and other processes are alternately executed. As a result, in addition to the time needed for the pressing process, the operator needs to spend some time replacing the pressing molds before starting "non-pressing" processes, and as a result, overall efficiency of the pressing process is low.

SUMMARY OF THE INVENTION

The primary object of the invention is to provide a novel mold-pressing apparatus for molding and pressing material, which is internally provided with a single electric servo motor and a pair of linking mechanisms. The electric servo motor drives the mold-pressing apparatus and rotates itself in two directions. The electric servo motor is numerically controlled. The driving force of the electric servo motor is transmitted to the pressing mold via the linking mechanism by a rotation/reciprocation conversion means. By virtue of the linking mechanism, the mold-pressing apparatus can very easily and effectively apply appropriate pressure and adjust the pressure-applying speed, stroke of the pressing mold, and the pressing time at low cost also preserving a comfortable environment and improving overall efficiency of the pressing operation.

Another object of the invention is to provide a novel mold-pressing apparatus internally provided with a single electric servo motor and a linking mechanism, which can effectively aid in replacing the pressing molds by moving them from the pressing position to the mold-exchange position.

The mold-pressing apparatus embodied by the invention allows loading of molding object between the upper and lower molds each storing heating means, and then allows driving means to drive the pressing mold composed of the upper and lower molds in order to press, heat and mold the loaded object of molding.

The mold-pressing apparatus is internally provided with a single electric servo motor 8 performing rotations (R) in the normal and reverse directions. A drive controller is formed by connecting the numerical control circuit 21 to the electric servo motor 8. The output shaft of the electric servo motor 8 is connected to the linking mechanism 16 via a rotation/reciprocation conversion means. The pressing mold 4 is driven by connecting either of the upper and lower molds 2 and 3 to the linking mechanism 16. The electric servo motor and the linking mechanism are features of the mold-pressing apparatus embodied by this invention.

Either of the upper and lower molds 2 and 3 of the pressing mold 4 to be driven by the system moves along a plurality of guide posts 5 which are vertically erected on the base 13 of the mold-pressing apparatus 1 in parallel with each other. The screw shaft 12 of the rotation/reciprocation conversion means is erected in the center of the portion surrounded by these guide posts 5. When a driving force from the electric servo motor 8 is applied, the screw shaft 12 performs rotation R. Follower 15 is connected to the screw shaft 12 by threads on the shaft to compose rotation/reciprocation conversion means. A plurality of linking mechanism components of the linking mechanism 16 are symmetrically disposed across the screw shaft 12 and follower 15, where the linking mechanism is composed of the input-side linking arm 17 having an end 17a connected to the follower 15 via shaft, the output-side linking arm 18 having an end 18a connected to either of the upper and lower molds 2 and 3 of the pressing mold 4, and supporting linking arm 19 having an end 19a connected to the mold-pressing apparatus 1 via a shaft. The plurality of linking mechanism components are respectively connected to the other end 17b of the input-side linking arm 17, the other end 18b of the output-side linking arm 18, and the other end 19b of the supporting linking arm 19. Due to the arrangement of these structural components, the plurality of linking mechanism components 16 are synchronously operated by the driving force from the single electric servo motor 8 inside of the mold-pressing apparatus 1 via the screw shaft 12 and the follower 15 so that either of the upper and lower molds 2 and 3 of the pressing mold 4 can be operated. The above arrangement provides an embodiment of the mold-pressing apparatus of the invention.

Another embodiment provides such a novel mold-pressing apparatus internally having a single electric servo motor 8 and linking mechanism featuring provision of the following:

Either of the upper and lower molds 2 and 3 of the pressing mold 4 to be driven by the system moves along a plurality of guide posts 5 which are vertically erected on the base 13 of the mold-pressing apparatus, 1 in parallel with each other. The linking mechanism 16 is composed of the crank-shape input-supporting linking arm 19 having an end 19a connected to the output shaft 9 of the electric servo motor 8 to perform the function of rotation/reciprocation conversion means, and the output-side linking arm 18 having an end 18a connected via shaft to either of the upper and lower molds 2 and 3 to be driven, where the other end 19b of the input-supporting linking arm 19 and the other end 18b of the output-side linking arm 18 are respectively connected to the linking arm 16, where the plurality of linking mechanism components are symmetrically disposed across the center of the portion surrounded by a plurality of guide posts 5 in company with the electric servo motor 8. By virtue of the arrangement of these components, the plurality of linking mechanism 16 are symmetrically operated by the synchronous driving operation of the electric servo motor to drive either of the upper and lower molds 2 and 3 of the pressing mold 4.

Another embodiment provides such a novel mold-pressing apparatus having a single electric servo motor and linking mechanism featuring the following: pressing-mold transfer means which horizontally moves the pressing mold 4 composed of the upper and lower molds 2 and 3 in a range between the pressing position P1 and the mold-exchanging position P2, and pressing-mold positioning and fixing means which positions the pressing mold 4 at the pressing position P1 and secures it in position. As a result, the pressing process can be implemented by the pressing mold 4 fixed at the pressing position P1, and in addition, process for replacing the molds of the pressing mold 4 can also be executed at the mold-exchanging position P2 which is horizontally displaced from the pressing position P1.

It is also possible for the invention to allow pressing-mold transfer means with a number of air-jetting holes 39 jetting compressed air from an air-compressor 57 and a plurality of air-lifting devices 29 which are disposed along the moving path of the pressing mold 4 to pneumatically lift the pressing mold 4 from the air-lifting devices 29 with compressed air jetted out of the air-jetting holes 39 of the air-lifting devices 29 before eventually moving the pressing mold 4.

When executing the above process, it is desired that the pressing mold 4 be provided with upper-mold retention means for maintaining the upper and lower molds 2 and 3 at a predetermined clearance by inserting this between both molds and retaining the upper mold 2 against the lower mold 3.

The upper-mold retention device is composed of, a plurality of space holders 43 each having an aperture on the cylindrical side wall in the axial direction so they may be coupled longitudinally to the upper-mold sliding guides 41 which are respectively erected on the lower mold 3 and allow the upper mold 2 to move vertically S against the lower mold 3 by allowing the upper mold 2 to penetrate through it.

By virtue of the structural arrangement mentioned above, when the electric servo motor 8 starts rotating, driving force from this servo motor 8 is transmitted to the pressing mold 4 via the linking mechanism 16. The driving force is amplified by the mechanical advantage provided by the linking mechanism 16 so that the amplified pressure can be applied to the pressing mold 4, thus securing the pressure needed for pressing the object of molding. Numerical control circuit 21 controls the rotation of the electric servo motor 8. As a result, the speed of applying pressure to the pressing mold 4 can be controlled by the numerical control circuit 21 by controlling the rate of rotation of the output shaft of the electric servo motor 8.

As soon as the electric servo motor 8 stops normal rotation R1, the pressing mold 4 also stops its pressing operation. The numerical control circuit 21 controls the angle of the rotation of the output shaft of the electric servo motor 8. The clearance between the upper and lower molds 2 and 3 of the pressing mold 4 is determined in accordance with the rotation angle of the output shaft of the electric servo motor 8. Accordingly, the clearance between the upper and lower molds 2 and 3 of the pressing mold 4, i.e., the stroke of the pressing mold 4, can be adjusted by the control applied to the electric servo motor 8 by the numerical control circuit 21. The period of applying pressure to the object of molding can be controlled by controlling the ceased period of the rotation of the electric servo motor 8 by stopping the rotation of this servo motor 8 while the pressing mold 4 applies pressure to the object of molding.

As mentioned above, by jointly operating the electric servo motor 8 and the linking mechanism 16, the mold-pressing apparatus easily applies the necessary pressure to the pressing mold 4 and finely adjusts the pressure-applying speed, stroke of the pressing mold, and the period of applying pressure to the object of molding. Because the electric servo motor 8 is used for driving the mold-pressing apparatus 1 embodied by the present invention, there is no potential for staining the work area and product with leaking hydraulic oil and the temperature of the work environment remains at a comfortable level. Since the operation of the electric servo motor 8 is numerically controlled by the numerical control circuit 21, automated operation of the mold-pressing apparatus can be employed to easily improve the efficiency of the pressing process.

The pressing mold 4 can be transferred between the pressing position Pl and the mold-exchanging position P2. The pressing mold 4 executes the pressing operation against the object of molding at the position Pl and allows operator to replace molds at the mold-exchanging position P2. As a result, the system allows the operator to effectively and easily replace the pressing molds, thus easily and securely promoting the overall efficiency of the pressing operation.

BRIEF DESCRIPTION OF THE DRAWINGS

To solve the technical problems inherent to the conventional mold-pressing apparatuses, the mold-pressing apparatus embodied by the invention is provided with the technical means described below. Explanation of those components of the mold-pressing apparatus is given by way of reference numerals shown in the accompanying drawings.

FIGS. 1 through 13 designate embodiments of the invention wherein;

FIG. 1 is the front view of the present invention;

FIG. 2 is a front view of the mold-pressing apparatus of the present invention in which the lower mold descends;

FIG. 3 is a front view of the mold-pressing apparatus of the present invention in which the lower mold ascends;

FIG. 4 is a graphic chart representing the stroke of the pressing mold as a function of the rotating angle of the drive shaft;

FIG. 5 is a graphic chart representing the variation rate of the stroke of the pressing mold;

FIG. 6 is a graphic chart representing the variation of the applicable pressure;

FIG. 7 is a plan view of the mold pressing apparatus of the present invention;

FIG. 8 is an enlarged plan view of the apparatus after removing the upper mold;

FIG. 9 is an enlarged front view representing the state of transferring the pressing mold in the mold-pressing apparatus;

FIG. 10 is a plan view of the lower mold including the sectional views of the upper slide guide members, space holder, and space-holder loading/unloading means along lines X - X' shown in FIG. 9;

FIG. 11 is a lateral view of the mold-pressing apparatus, in which the lower portion is deleted from the upper portion of the upper bed and the lower portion of the lower bed;

FIG. 12 is an enlarged view of the positioning pin of FIG. 11;

FIGURE 13 is a chart representing the processes of the mold-pressing operation; and FIG. 14 is a front view of a second embodiment of the mold-pressing apparatus according to the present related to the invention.

DESCRIPTION OF THE PREFERRED EMBODIMENTS

Figure 1:
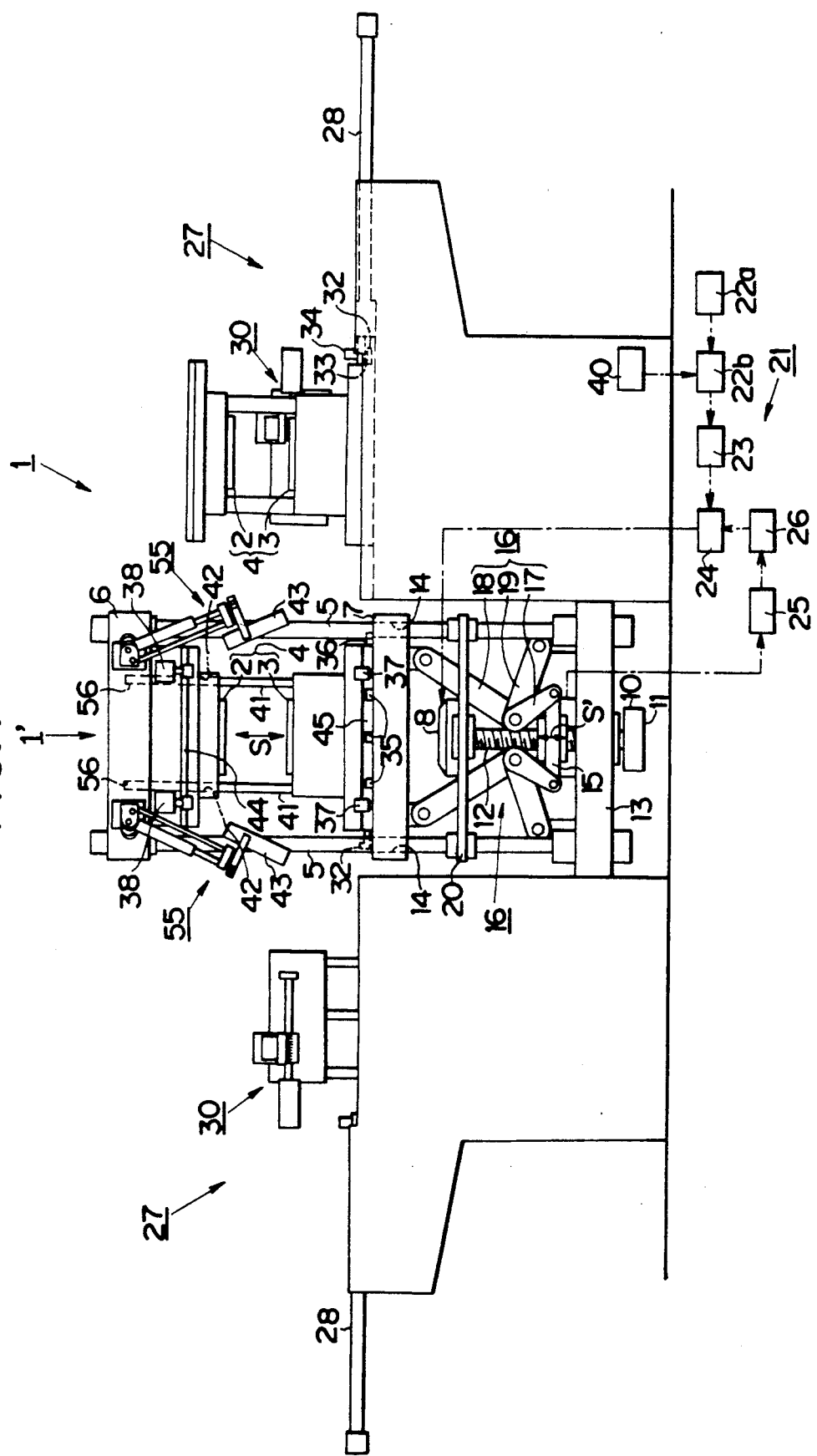

Referring now more particularly to the accompanying drawings, a preferred embodiment of the mold-pressing apparatus related to the invention is described below.

FIGS. 1 through 13 respectively designate the first embodiment of the invention. The essentials of the invention are embodied in the mold-pressing apparatus which molds and presses integrated circuits in the following example. Each of these integrated circuits is built on a substrate which incorporates a variety of electronic elements and lead wires. The periphery of the substrate is molded by resin. To mold the periphery of the substrate, first, substrates and resin powder are loaded into the space between the upper and lower molds 2 and 3 of the mold-pressing apparatus 1. Then, these substrates and resin powder are pressed and heated to about 180° C. before eventually being molded. It should be understood that, in this embodiment, the upper mold of the pressing mold 4 is secured to the mold-pressing apparatus 1 and the lower mold 3 to ascends from below. The upper mold 2 is secured to the upper bed 6 which is fixed to the upper ends of four guide posts 5. Each of four guide posts 5 is erected in the vertical direction in parallel with each other. Each of these guide posts 5 is provided with reinforcing member 20. The bottom end of each guide post 5 is secured to the base 13 of the mold-pressing apparatus 1. The lower bed 7 is installed below the upper mold 2. The lower bed 7 has four guide holes 14 to allow these guide posts 5 to pass through them. The lower bed 7 is moved in the vertical direction along these guide posts 5 by a driving means installed below the lower bed 7.

The structure mentioned above is identical to that of any conventional mold-pressing apparatus. The present invention solves the technical problems of the conventional apparatus mentioned earlier.

The mold-pressing apparatus based on the first embodiment of the invention is provided with a single electric servo motor for driving the pressing molds. SEE FIGURES I and 7. The output shaft of the electric servo motor 8 is coupled to a timing pulley 11 via timing belt 10. The timing belt 11 is installed on the bottom edge of the screw shaft 12, having a ball screw. The screw shaft 12 extends upward through the bottom of the base 13. To prevent the screw shaft 12 from moving in the vertical direction against the base 13, the screw shaft 12 is secured to the base 13 with a thrust bearing so that the screw shaft 12 can freely rotate R' against the base 13. Illustration of the thrust bearing is not shown. Follower 15 is secured to the screw shaft 12 by a screw threads so that rotation of the screw shaft movs the follower axially along the shaft which in turn becomes rotation reciprocation of the lower bed. Part of the input-side linking arm is secured to the linking mechanism 16 via a pivot. The linking mechanism 16 is composed of the input-side linking arm 17, the output-side linking arm 18, and the supporting linking arm 19. An end 17b of the input-side linking arm 17 is coupled to the follower 15 via a pivot. An end 18b of the output-side linking arm 18 is coupled to the bottom surface of the lower bed 7. An end 19b of the supporting linking arm 19 is coupled to the base 13. The other end 17b of the input-side linking arm 17, the other end 18b of the output-side linking arm 18, and the other end 19b of the supporting linking arm 19, are respectively coupled to each other, thus forming the linking mechanism 16. The first embodiment of the invention provides a pair of the linking mechanism 16, which are symmetrically opposed across the screw shaft 12 and on opposite sides of the follower 15. The electric servo motor 8 is connected to the numerical control circuit 21. The numerical control circuit 21 is of closed-loop composition incorporating the tape-reader 22a, input circuit 22b, arithmetic operation circuit 23, servo circuit 24, rotation-angle sensor 25, and counter 26. The numerical controller is formed by combining the numerical control circuit 21 with the electric servo motor 8 and the control panel 40.

The mold-pressing apparatus 1' is set in the center of the mold-pressing integral apparatus 1 embodied by the invention. See FIG. 2. The pressing mold 4 of the first embodiment has four upper-mold sliding guides 41 each being erected vertically on the lower mold 3. There are a plurality of slide-guide holes 42 for allowing these upper-mold sliding guides 41 of the upper mold 2 to pass through them so that only the upper mold 2 can move itself in the vertical direction against the lower mold 3. The position of the upper mold 2 is securely held against the lower mold 3 by a cylindrical space holder 43 having a slot along the axial direction permitting coupling to the upper-mold sliding guides 41. Extended member 44 is provided above the upper mold 2. The extended member 44 is secured by the upper-mold clamper 38. Another extended member 45 secured by the lower-mold clamper 37 and hook 32 engaging with the hooking pin 33 of the pneumatic cylinder 28 of pressing-mold transfer means are installed below the lower mold 3. The upper and lower molds 2 and 3 respectively incorporate a heater which heats resin powder and molds IC substrates. Since any conventional heater can be used, description and illustration of heater are not included. Likewise, the upper and lower molds 2 and 3 are respectively provided with a concave cavity for molding resin powder and the IC substrates. However, since the shape of the concave cavity is arranged according to the shape of the IC substrates to be molded, description and illustration of the cavity are not included.

The mold-pressing apparatus 1' incorporates press-mold positioning and fixing means which positions and fixes the pressing mold 4 after being transferred to the pressing position P1 between the upper and lower beds 6 and 7. See FIGS. 7 and 8. The positioning device is set to the upper surface of the lower bed 7, which is lifted from the upper surface by the guide roller 35 and the electromagnetic solenoid used for positioning the pressing mold 4 (to be transferred to the pressing position P1) in the forward and backward directions when the bottom of the mold-pressing apparatus 1 shown in FIG. 8 corresponds to the front of the apparatus 1 and the top of the apparatus 1 shown in FIG. 8 corresponds to the rear. The positioning device is composed of positioning pins 36a and 36b which respectively determine the positions of the lower mold 3 in the left and right directions shown in FIG. 8 by contacting the lower mold 3 in the protruded condition. The fixing device of the press-mold positioning and fixing means is vertically moved by an ejector (not shown) which is set to the lower bed 7 and uses an electric motor and a cam. The fixing device has the lower-mold clamper 37 which presses against the extended member 45 of the lower mold 3 of the pressing mold 4 at the position descended from upper position so that the lower mold 3 can be fixed. The upper bed 6 is provided with a clamper 38 having the structure almost identical to that of the lower-mold clamper 37.

Two ranks of air-lifts 29 are disposed in the left and right directions on the upper surface 7a of the lower bed 7. The air-lifts 29 are provided with a number of air-jetting holes jetting compressed air from the air-compressor 57 for slightly lifting the pressing mold 4. Each of these air-lifts 29 is provided with four groups of nine holes 39, for a total of 36 units of air-jetting holes 39. A plurality of valves 58 are installed inside of tubes distributed between each of these four groups of air-jetting holes 39 and the air compressor 57.

Figure 9:
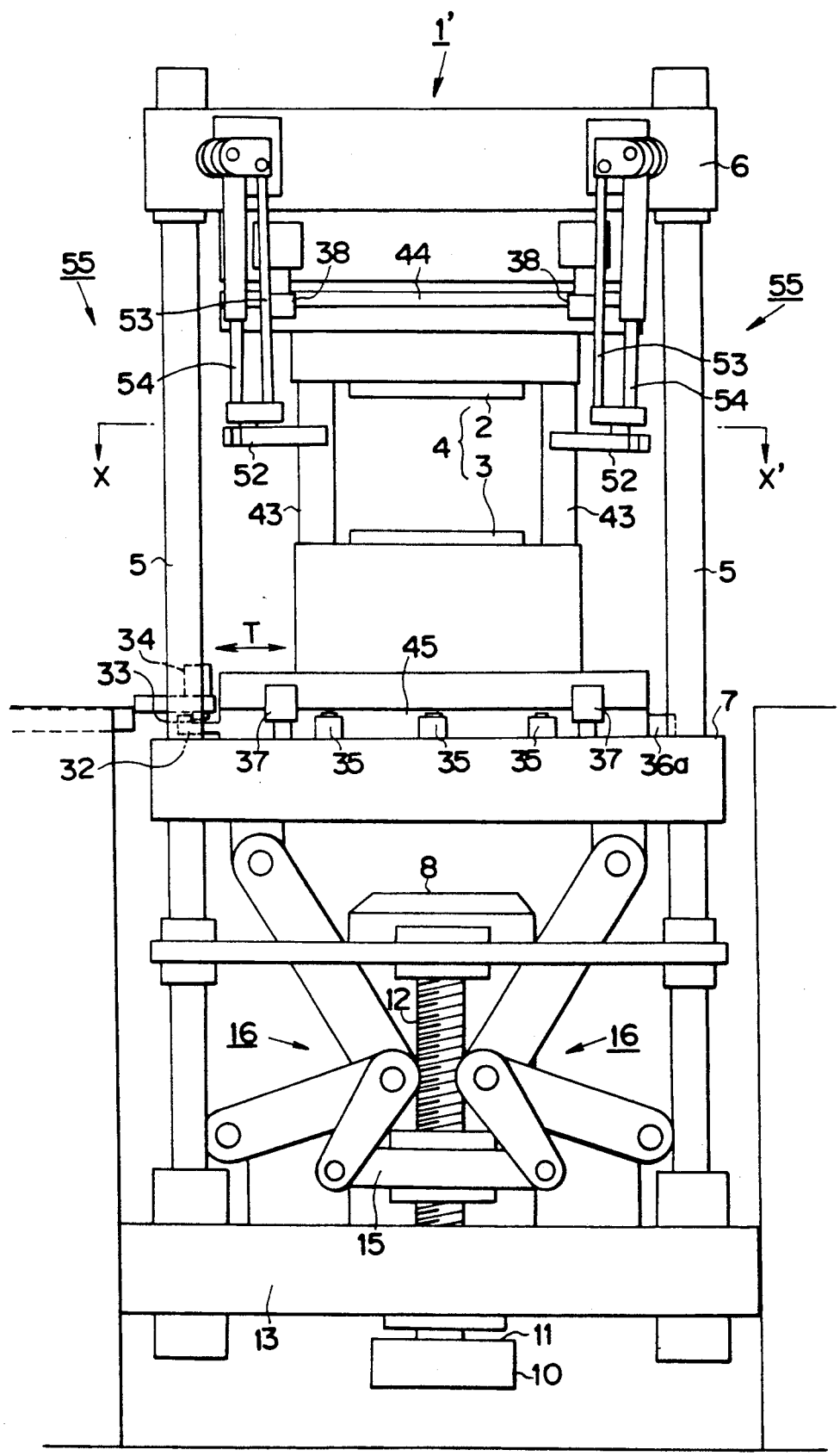
Figure 10:
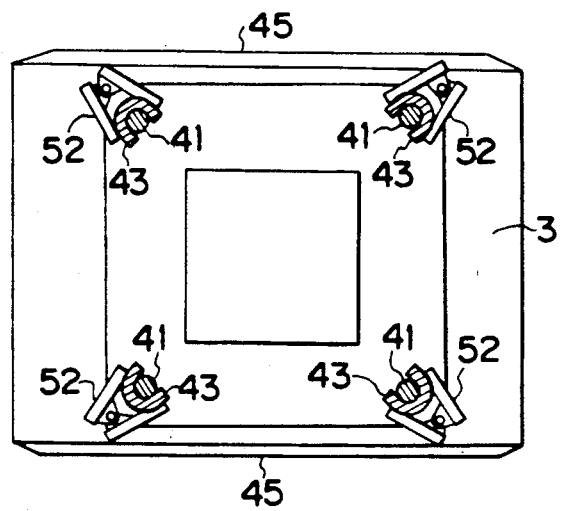
Figure 12:
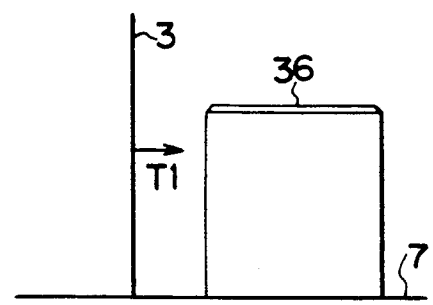
Figure 11:
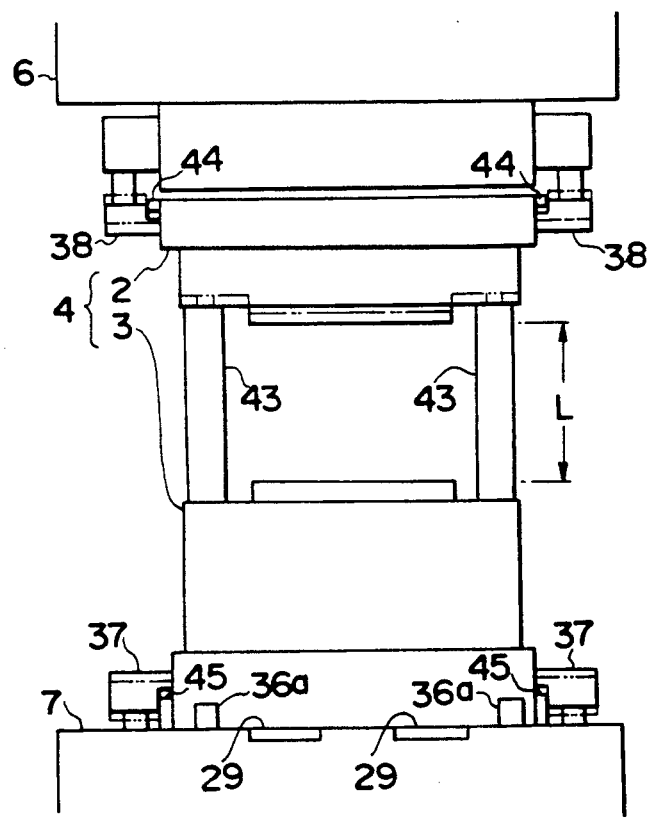
Figure 13:
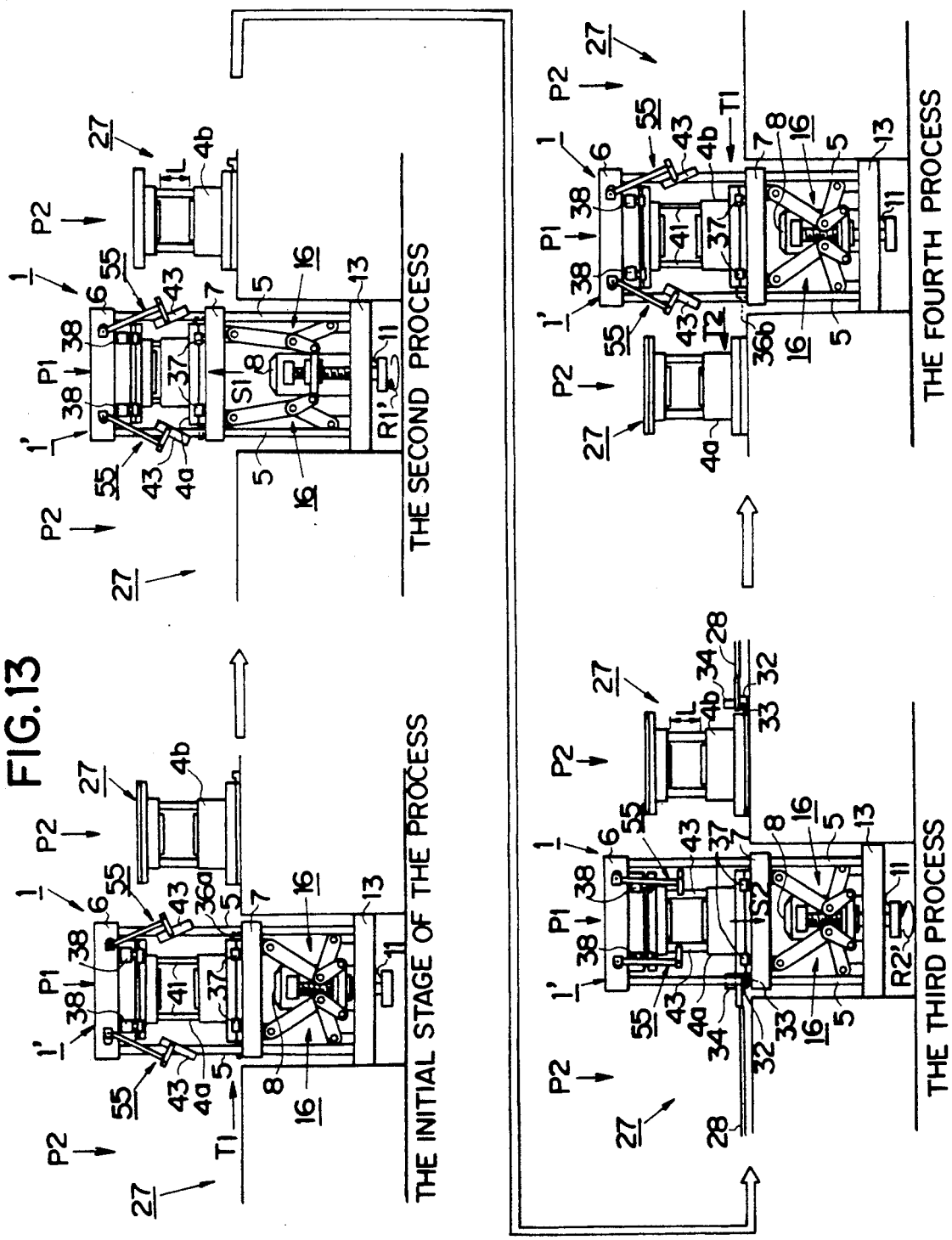

Referring to FIG. 9, the upper bed 6 is provided with a space-holder loading and unloading means 55 which is composed of clamper 52 for loading and unloading the space holder 43 into and from the pressing mold 4 transferred to the pressing position P1. A supporting member 53 supports the clamper 52 by suspending it; and a pneumatic cylinder 54 drives the clamper 52. The clamper 52 is provided with a pair of clamping members which freely open and close themselves and are secured to the clamper 52 by a pivot. Each of these clamping members opens and closes itself by means of force energized by an electromagnetic solenoid (not shown).

Figure 2:
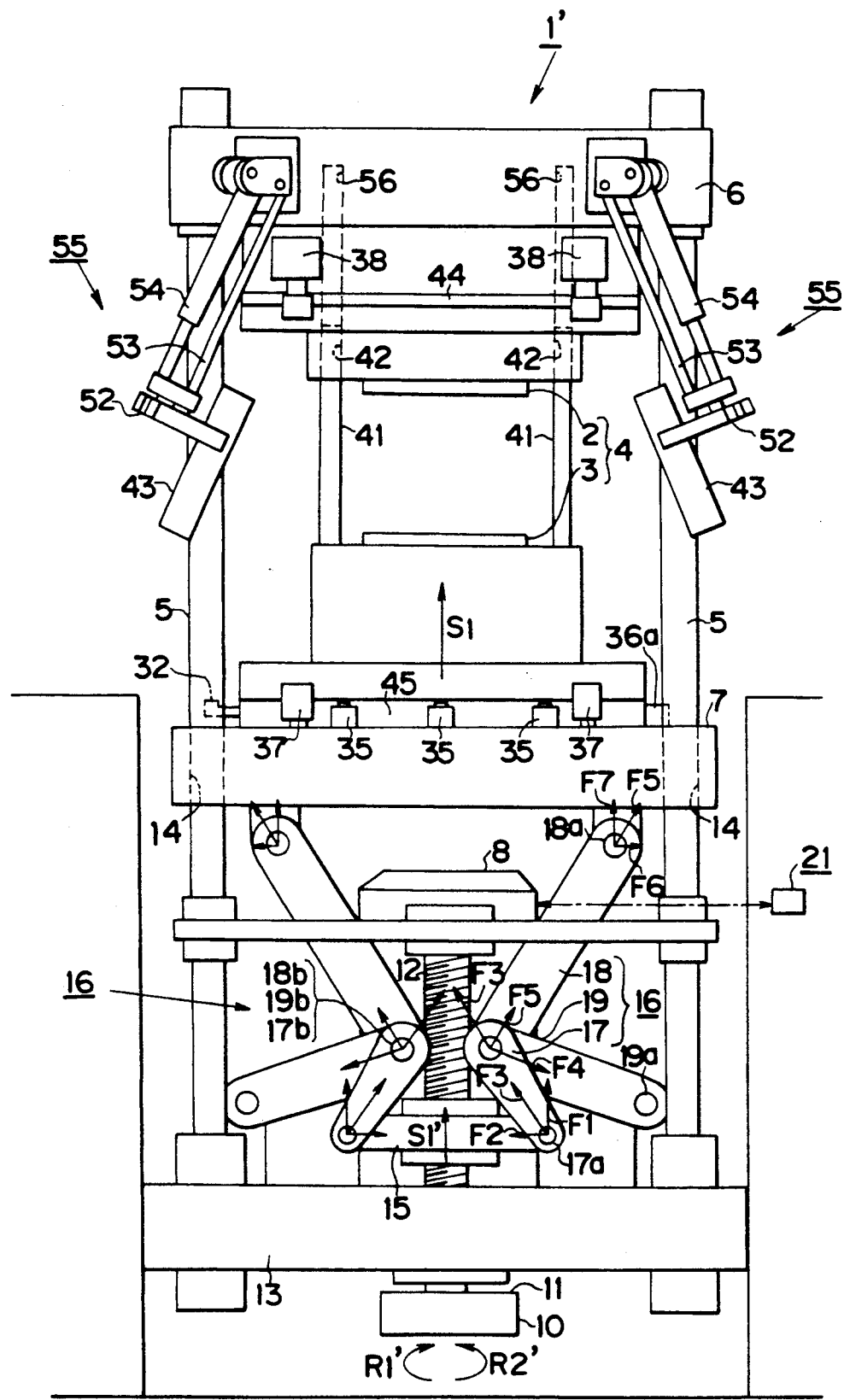

A pair of escape holes 56 are provided for the upper bed 6 to generate relief when the upper sliding guide 4 of the pressing mold 4 protrudes (See FIGURE 1 or 2).

A "non-pressing" operating unit 27 is installed on each side (the left and right positions shown in FIGURE I) of the mold-pressing apparatus 1'. The "non-pressing" operating unit 27 is composed of: the pneumatic cylinder 28; air-lifts 29; lower-mold cleaning brush 30; and molded piece loading and unloading means 31 (see FIG. 7).

The pneumatic cylinder 28 has a hooking pin 33 which is engaged with a stopper hook 32 of the lower mold 3 and the electromagnetic solenoid 34 for raising the hooking pin 33 (See FIG. 1). The pneumatic cylinder 28 causes the lower mold 3 to move to and from the pressing position P1 and the mold-exchanging position P2 by extending and contracting itself when the projected hooking pin 33 is engaged with the stopper hook 32 of the lower mold 3. The system uses air-lifts 29 identical to those provided for the lower bed 7. The lower-mold cleaning brush 30 is composed of brush 46, sliding arm 47 which causes the brush 46 to reciprocate its movement back and forth, and another sliding arm 48 which causes the brush 46 to reciprocate its movement to the left and to the right. Means 31 for loading and unloading the molding object is composed of the suction head 49 which attaches to the molded and pressed IC substrates on the lower mold 3 by negative pneumatic pressure. Sliding arm 50 moves the suction head back and forth, and another sliding arm 51 increases the suction head 49 to the left and to the right to move the suction head in and out of the mold area. In addition to the suction head 49, means 31 for loading and unloading the molding object is provided by the resin-powder supply means for feeding resin powder to the lower mold 3. However, description and illustration of this means is not included.

Referring to FIG. 1, data read by the tape reader 22a and stored in the input circuit 22b is output to the arithmetic operation circuit 23. As a matter of course, data can optionally be varied by the operator through the control panel 40. The arithmetic operation circuit 23 then converts the received data into pulses needed for driving the electric servo motor 8, and then, the converted pulses are transmitted to the servo circuit 24 for driving the electric servo motor 8. Since the numerical control circuit 21 in this embodiment is of closed-loop type, the servo circuit 24 has a comparison circuit and a servo-amplifying circuit. Since the comparison and servo circuits are conventionally known, description and illustration of these are not included.

A rotation-angle sensor 25 detects the rotation angle of the output shaft 9 of the electric servo motor 8 to allow the counter 26 to convert the detected angle into numerical values. The comparison circuit of the servo circuit 24 continuously compares the numerically converted rotation angle and the driving pulses. If any error were generated between these, the rotation of the electric servo motor 8 is controlled to minimize the error. Next, the screw shaft 12 is rotated by the driving force from the electric servo motor 8 via the timing belt 10 and the timing pulley 11. The rotation R' of the leader 12 causes the follower 15 to move vertically S'.

Figure 3:
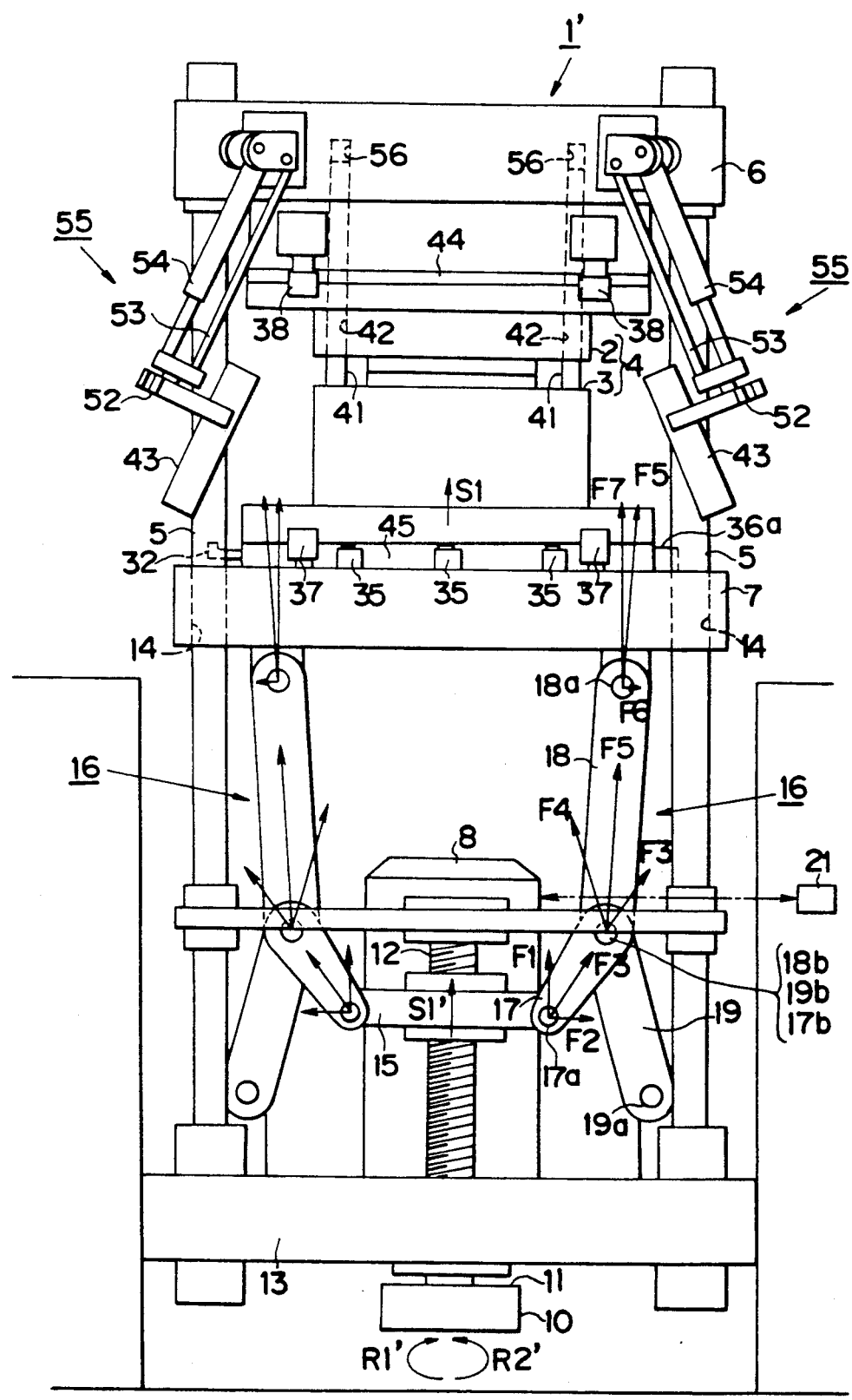

Assume that the rotation R of the electric servo motor 8 in the direction of lifting the follower 15 is clockwise R1, whereas the rotation R of this servo motor 8 in the direction of lowers the follower 15 is counterclockwise R2, then the following operations can be performed. The linking mechanism 16 begins its operation simultaneous with the rise (S1') of the follower 15. As shown in FIG. 2, when the follower 15 rises, force F1 applied to an end 17a of the input-side linking arm 17 is synthesized with the horizontal reaction force F2 before becoming stress F3. Stress F3 is then applied to the other end 19b of the supporting linking arm 19, and then stress F3 is synthesized with reaction force F4 transmitted from the end 19b to the end 19a before becoming stress F5. Stress F5 is then transmitted from the end 18b of the output-side linking arm 18 to the end 18a before being transmitted to the lower bed 7. The horizontal component F6 of stress F5 transmitted to the lower bed 7 is received by the guide posts 5, and then the vertical component F7 becomes the force which lifts the lower bed 7. Based on these processes, the lower bed 7 is lifted S1. Simultaneously, the lower mold 3 is also lifted and presses resin powder and the IC substrates inserted between the upper and lower molds 2 and 3. When pressure is applied, heaters inside of the upper and lower molds 2 and 3 respectively heat resin powder and IC substrates and mold them. When these processes are underway, the linking mechanism 16 enters into the state shown in FIG. 3. FIG. 3 designates that the vertical component F7 of stress F5 lifting the lower bed 7 by the amount S1 is generated by force F1 applied to an end 17a of the input-side linking arm 17. FIG. 4 is the graphic chart representing variation of the stroke of the lower mold 3 against the rotating angle of the output shaft 9 of the electric servo motor 8. It indicates that the stroke of the lower mold 3 is variable relative to the rotation R of the output shaft 9 of the electric servo motor 8. In other words, it is clear that the stroke of the lower mold 3 is determined by the rotating angle of the output shaft 9 of the electric servo motor 8. It is also clear that the variable amount per unit time of the stroke of the lower mold 3, i.e., the speed of applying pressure, is determined in correspondence with the variable rotation rate of the output shaft 9 of the electric servo motor 8, i.e., in correspondence with the speed of the rotation of the output shaft 9 of the electric servo motor 8. FIG. 5 is the graphic chart designating the rate of the variation of the stroke of the lower mold 3 against the rotating angle of the output shaft 9 of the electric servo motor 8. It indicates that the rate of variation of the stroke of the lower mold 3 is determined in correspondence with the rotating angle of the output shaft 9 of the electric servo motor 8 and the rate of the variation of the stroke decreases relative to an increase of the rotating angle of the output shaft 9 of the electric servo motor 8. More particularly, the graphic chart shown in FIG. 5 designates that, when the output shaft 9 of the electric servo motor 8 rotates by the amount R1 at a constant speed, as the lower mold 3 rises by the amount S1, the speed of applying pressure during the rise S1 of the lower mold 3 decelerates. If the electric servo motor 8 outputs constant driving force, it is obvious that more amount of pressure is applied to the lower mold 3 as the rate of the variation of the stroke decreases. Concretely, as shown in FIG. 6, applied pressure grows with an increase of the angle of the rotation of the output shaft 9 of the electric servo motor 8. The applied pressure is at the maximum when the lower mold 3 rises to the upper limit. More particularly, about 50 tons of pressure may be applied in some case for example. As a result, applicable pressure can be determined in a range capable of securing enough pressure needed for the molding press by selecting the limit of the normal rotation of the output shaft 9 of the electric servo motor 8. In this manner, the system can apply enough pressure to the molding press by effectively operating the linking mechanism 16. The stroke of the lower mold 3 can also be determined by defining the limit of normal rotation of the rotating angle of the output shaft 9 of the electric servo motor 8 via the numerical control circuit 21. When the limit of the normal rotation is reached, the numerical control circuit 21 stops the rotation of the electric servo motor 8. The rotation-ceased period of the servo motor 8 can be used for adjusting the period of applying pressure. The speed of applying pressure to the lower mold 3 can be adjusted by controlling the rotation rate of the output shaft 9 of the electric servo motor 8. Compared to the case of using oil pressure for driving the pressing mold, the mold pressing apparatus embodied by the invention does not generate the heat caused by varied oil pressure. As a result, when operating the apparatus embodied by the invention, there is no fear of generating an uncomfortable working environment caused by the rise of ambient temperature. Also, there is no fear of staining the mold-pressing apparatus 1 and surrounding locations caused by the leaked oil and also no fear of causing a fire from pressurized oil. The electric servo motor 8 activates the driving operation only at the time of lifting and lowering the lower mold 3. The electric servo motor 8 remains OFF while the lower mold 3 is not moving. Consequently, the mold-pressing apparatus embodied by the invention minimizes noise from the electric servo motor 8 and operating costs even when the entire system operates.

There are conventional pressing devices which are designated to stabilize the speed of one-way rotation of a one-way rotating electric motor in combination with a crank and flywheel. This pressing apparatus provides desirable performance when continuously executing pressing operation by applying constant pressure tact to the punching or bending of sheets. Nevertheless, this pressing apparatus cannot be used for pressing requiring substantial duration and for applying pressure and adjusting the period of applying pressure as is done by the mold-pressing apparatus embodied by the present invention.

Next, after completing the pressing process described above, the pressing mold 4 is transferred from the pressing position P1 to the mold-exchanging position P2. The transfer T of the pressing mold 4 before and after execution of the pressing process is described below.

Assume that the pressing mold 4 is transferred in a range between the mold-exchanging position P2 on the left side of the mold-pressing unit 1 and the pressing position P1 shown in FIGS. 1 and 7. The range of transfer T from the mold-exchanging position P2 to the pressing position P1 is referred to as the transfer T1 and the range of the transfer T from the pressing position P1 to the mold-exchanging position P2 as the transfer T2 for discrimination. First, when the T1 mode is entered, the operator loads the space holder 43 in the upper-mold sliding guide 41 between the upper mold 2 and the lower mold 3 of the pressing mold 4. As a result, clearance between the upper and lower molds 2 and 3 is retained by the predetermined distance L. The IC substrates and resin powder are loaded in the concave cavity of the lower mold 3. Next, valves 58 between the air compressor 57 and the air-lifts 29 and 29' are released to allow compressed air from the compressor 57 to jet out of air-jetting holes 39 of the air-lifts 29 and 29', and then the pressing mold 4 floats slightly in air. Next, hooking pin 33 of the pneumatic cylinder 28 projects itself so that it can be engaged with the hook 32 of the lower mold 3. Then, the pressing mold 4 is energized by the pneumatic cylinder 28 via the hooking pin 33 and the hook 32 in order that the pressing mold 4 can be transferred from the mold-exchanging position P2 to the pressing position P1 on the lower bed. The pressing mold 4 is moved along the air-lifts 29 and 29'. According to the position of the pressing mold 4 on the air-lifts 29 and 29', the opening and closing operation of valves 58 is selectively controlled to allow compressed air to be jetted out of four groups of jetting holes 39' below the pressing mold 4, thus effectively minimizing the consumption of compressed air (see FIG. 8).

While the above process is underway, the right-side positioning pin 39a of the left/right positioning pin 39 of the lower bed 7 protrudes. Next, when being transferred from the mold-exchanging position P2 to the pressing position P1, the pressing mold 4 is guided by the guide roller 35 until contacting the positioning pin 39a (see FIG. 12). The lower mold 3 is then secured to the lower bed 7 by means of the lower-bed clamper 37, and at the same time, the upper mold 2 is secured to the upper bed 6 by means of the upper-mold clamper 38. The upper mold 2 is slightly lifted by the upper-mold clamper 38 (see FIG. 11). Illustration of the guide posts 5 and space-holder loading/unloading means 55 is not shown in FIG. 11. When fixing these molds 2 and 3, valves 58 of the air-lifts 29 and 29' are fully closed. The clamping member 52 clamps the space holder 43, thus allowing the space holder 43 by the operation of the clamper-use pneumatic cylinder 54 of space-holder loading/unloading means 55 (see FIGS. 9 and 10). Next, the clamper-use pneumatic cylinder 54 lifts the clamping member 52 while holding the space holder 43 to be disengaged. The pressing mold 4 is transferred to the pressing position P1 in the T1 mode. The pressing operation is executed by sequentially carrying out those processes mentioned above. After completing the pressing process, the pressing mold 4 is transferred from the pressing position P1 to the mold-exchanging position P2 under the T2-mode operation which is implemented by reversing the T1-mode operations. The first space-holder 43 is loaded, and then the upper-mold clamper 38 and the lower-mold clamper 37 respectively release the clamping force to allow the pneumatic cylinder 28 to execute the T2-mode operation mentioned above by transferring the pressing mold 4 to the mold-exchanging position P2. The processes related to the mold-pressing operations under the T1-mode transfer of the pressing mold 4 including the pressing, heating, and the process for externally removing the pressing mold 4, are described below, see FIG. 13. Assume that the left-side pressing mold 4a and the right-side pressing mold 4b are used for composing the pressing mold 4. First, during the initial stage of the process, the left-side pressing mold 4a is transferred from the left-side mold-exchanging position P2 to the pressing position P1 under the T1 mode, and then the mold 4a is secured in position. Assume that the right-side pressing mold 4b has already completed the mold-pressing process. When the second process is entered, the lower mold 3 is lifted by the driving force from the electric servo motor 8 against the left-side pressing mold 4a in the pressing position P1 for pressing and heating the resin powder and IC substrates. After completing the pressing and heating processes, the third process is entered, where the lower mold 3 descends (S2). While the second and third processes are underway, IC substrates with molded object are extracted from the right-side pressing mold 4b by operating molded-object loading/unloading means 31. Next, brush 30 removes residual resin powder adhered to the lower mold 3, and then a process for loading IC substrates and resin powder in the lower mold 3 is executed before molding and pressing them. These processes are referred to as "non-pressing operations" in the following description. When the fourth process is entered, the left-side pressing mold 4a is transferred (T2) to the left-side mold-exchanging position P2, and simultaneously, the right-side pressing mold 4b is brought (T2) to the pressing position P1 from the right-side mold-exchanging position P2. In the same way, pressing processes are executed by alternately operating the right-side pressing mold 4b and the left-side pressing mold 4a. Since the mold-pressing apparatus embodied by the invention can simultaneously execute the pressing and "non-pressing" processes, operating efficiency of the mold-pressing apparatus can easily be promoted. When changing the kinds of integrated circuits to be pressed by molds, the system can remount the pressing mold 4 compatible with the kinds of integrated circuits at the mold-exchanging position P2. When executing this operation, the pressing mold 4 can be remounted at the mold-exchanging position P2 in the state of combining the upper and lower molds 2 and 3 together. As a result, the operator can easily replace the pressing mold 4. Because of this, total operating efficiency of the mold pressing operation can easily be promoted. The space holder 43 can be loaded between the upper and lower molds 2 and 3 of the pressing mold 4, and thus, the operator can extract the resin-molded integrated circuits from the space between the upper and lower molds 2 and 3, clean the lower mold 3 and load IC substrates and resin powder in the space between the upper and lower molds 2 and 3. Furthermore, since the space holder 43 can be removed, the lower mold 3 can move vertically in the pressing position P1.

In the light of the recently grown demand for manufacturing a wide variety of merchandise in small production lots by means of mold-pressing apparatuses, it is possible for the mold-pressing apparatus embodied by the invention to easily customize the pressure-applying speed, adjustment of the stroke of the pressing mold and the pressure-applying duration by numerically controlling the mold-pressing operation. Because of the ease of replacing a pressing mold 4, the operator can very easily change the kinds of the object to be molded by operating the mold-pressing apparatus 1 embodied by the invention.

The embodiment provides a pair of linking mechanism 16 for driving the lower bed 7 by securing balance between the left and the right. There is no need of defining the number of the linking mechanism merely to two units, but it is possible for the embodiment to provide three, four, or more than five units of the linking mechanism. However, since the lower bed 7 is of rectangular shape, it is desired that a total of four units of the linking mechanism be provided for each of the four corners of the rectangular lower bed 7. The embodiment provides the cylindrical space holder 43 for retaining the upper mold 2, where the space holder 43 has an aperture on the side wall. The invention does not require the shape of the space holder 43 to be only cylindrical.

To make the upper and lower molds 2 and 3, a rail may be provided for the air-lifts 29 and 29'. On the other hand, the lower mold 3 of the pressing mold 4 incorporates a heater generating 180° C. of heat. As a result, if the rail is introduced, lubricant for the rail must carefully be selected. Alternatively, a mechanical arrangement other than a rail can be introduced to bring the air-lifts into contact with the pressing mold 4, thus dispensing with lubricant. In other words, the air-lifts 29 and 29', can be easily maintained promoting easier maintenance of the entire mold-pressing apparatus 1.

Next, referring to FIG. 14, the second embodiment of the invention is described below. To implement the second embodiment, a pair of electric servo motors 8 is disposed below the lower bed 7 on both sides. Each of the output shafts 9 of these two electric servo motors 8 is horizontally disposed in the forward and backward directions. Each output shaft 9 is directly secured to the end 19a' of the supporting linking arm 19' of each linking mechanism 16 disposed in correspondence with each of these two electric servo motors 8. Each of these linking mechanism 16 is composed of the output-side linking arm 18, the input-supporting linking arm 19' and the synchronization-supplementary linking arms 17', where each of the synchronization-supplementary linking arms 17' of the linking mechanism 16 is axially secured to the synchronization supplementary slider 15' which is supported by a pair of slider guide members 59 so that each of the linking arms 17' can move vertically.

The second embodiment provides the upper and lower molds 2 and 3 in an arrangement without the space-holder loading and unloading means 55.

Each of the pair of electric servo motors 8 is connected to the numerical control circuit 21 so that they can rotate synchronously.

According to the structure of the second embodiment, as soon as these two electric servo motors 8 are synchronously activated, the pair of linking mechanism 16 corresponding to these two electric servo motors 8 are also synchronously operated, thus allowing the lower bed 7 to be driven in a balanced manner. When these operations are underway, since each of the synchronization-supplementary linking arms 17' are axially coupled to the synchronization supplementary slider 15', and since this slider 15' is vertically movable along the slider-guide member 59, operations of these two linking mechanism 16 can very easily be synchronized. In addition, since the second embodiment provides a pair of electric servo motors 8, compared to the first embodiment, by virtue of the synchronous rotation of these two electric servo motors 8, the composition of the numerical control circuit 21 becomes slightly complex. Nevertheless, when equivalent pressure is applied, the mold-pressing apparatus embodied by the invention can use such small electric servo motors 18 each having the output capacity one-half the one used for the first embodiment. Consequently, the mold-pressing apparatus reflecting the second embodiment can use compact electric servo motors 8 to eventually materialize a compact mold-pressing apparatus 1. On the other hand, if the apparatus introduces a pair of electric servo motors 8 having the output capacity equivalent to the one used for the first embodiment, applicable pressure will double.

When performing the mold-pressing process, the apparatus of the second embodiment allows only the lower mold 3 to move (T) between the pressing position P1 and the mold-exchanging position P2 without moving the upper mold 2 secured to the upper bed 6. Consequently, when executing the mold pressing of one kind of merchandise, the apparatus can perform the mold pressing operation by operating the upper mold 2 and a pair of lower molds 3. When switching the object to be molded, the apparatus embodied by the invention can also replace the upper mold 2 with the commonly workable lower mold 2.

As is clear from the foregoing description, the invention provides a wide variety of advantages.

According to the present invention, a novel mold-pressing apparatus is presented, which is provided with an electric servo motor and linking mechanism for molding and pressing the object of molding. The electric servo motor capable of rotating itself in the normal and inverse directions is used for driving the mold-pressing mechanism under the numerical control system, where the driving force from this servo motor is transmitted to the pressing mold via a linking mechanism by a rotation/reciprocation conversion mean. Accordingly, the apparatus secures enough pressure to the pressing mold and permits adjustment of the pressure-applying speed, stroke of the pressing mold, and the period of pressure applied very easily and inexpensively without complexity, and also improves the working environment in the mold-pressing site, thus increasing overall operating efficiency.

Since the apparatus uses a single electric servo motor, the control operation via the numerical control circuit can easily be implemented. In addition, the moving half of the pressing mold can be operated in perfect balance by virtue of a plurality of linking mechanisms.

Since the pressing mold can be transferred from the pressing position to the mold-exchanging position, the pressing molds can be replaced at the mold-exchanging position. As a result, an operator can quickly replace the pressing molds, thus easily improving overall operating efficiency of the mold-pressing process.

Air-lifts are provided for the apparatus as means for transferring the pressing mold. When transferring the pressing mold, the pressing mold floats slightly above the air-lifts. Consequently, there is no friction between the pressing mold and the air-lifts. This allows the operator to easily perform maintenance of the pressing mold and the entire mold-pressing apparatus.

When upper-mold retention means is loaded between the upper and lower molds of the pressing mold, an operator can perform interim processes between the upper and lower molds before and after executing the pressing process. As a result, the operating efficiency of the mold pressing work can be improved. In particular, operator can very easily replace the pressing molds as required. Additionally, a space holder for holding the upper mold can be provided for retaining the molds in position.

What is claimed is:

1. A mold pressing apparatus with an electric servo motor and link mechanism for pressurizing and heating molding material to form an article comprising:
   an upper and a lower mold having heating means;
   a reversible electric servo motor capable of rotating in forward and reverse directions;
   a linking mechanism comprising a plurality of link assemblies which connect the motor to the lower mold by a rotation to reciprocation conversion means to drive the lower mold toward and away from the upper mold;
   a numeral control circuit connected to the motor, forming a mold-driving controller for controlling the movement of the mold;
   an upper-mold retention means for maintaining a predetermined clearance between said upper and lower molds by securely holding said upper mold against said lower mold using said upper-mold retention means inserted between said upper and lower molds, said upper-mold retention means comprising a plurality of cylindrical space holders each having a slot so that each space holder is longitudinally connectable to upper mold slide guides which extend vertically from said lower mold and extend through said upper mold.

2. The mold-pressing apparatus in claim 1, wherein:
   the lower mold of said pressing mold moves along a plurality of guide posts which are vertically erected on a base of the mold-pressing apparatus;
   said rotation to reciprocation conversion means comprises a screw shaft surrounded by said guide posts, said screw shaft being rotated by a driving force from said electric servo motor;
   said rotation to reciprocation conversion means further comprises a follower connected to the screw shaft by screw threads;
   the plurality of link assemblies are symmetrically disposed around said screw shaft and follower;
   said link assemblies each comprise:
   an input-side linking arm having an end axially connected to said follower;
   an output-side linking arm having an end axially connected to said lower mold; and
   a supporting linking arm having an end axially connected to said mold-pressing apparatus, whereby each of said linking assemblies are synchronously operated by said screw shaft and follower by a driving force from said electric servo motor.

3. The mold-pressing apparatus as in claim 1, wherein:
   said pressing mold is driven by said electric servo motor and moves along said guide posts which are vertically erected on a base of said mold-pressing apparatus;
   said plurality of link assemblies are symmetrically disposed around a center portion of the apparatus and are surrounded by said guide posts;
   each of said link assemblies comprise: a crank-shaped input-supporting linking arm which functions as said rotation to reciprocation conversion means and has an end axially connected to said electric servo motor; and an output-side linking arm having an end axially connected to the lower mold;
   wherein another end of said input-supporting linking arm and another end of said output-side linking arm are respectively connected to said link assembly whereby said lower mold is driven by synchronous operation of said plurality of said link assemblies.

4. The mold-pressing apparatus as in claim 2 or 3, further comprising:
   a pressing-mold transfer means which horizontally transfers said pressing mold composed of the upper and lower molds between a pressing position and a mold-exchanging position; and
   a pressing mold positioning and fixing means which positions and fixes said pressing mold at said pressing position.

5. The mold-pressing apparatus as in claim 4, wherein said pressing mold transfer means comprises:
   a plurality of air-jetted holes which jet compressed air from a compressed-air supply source; and
   a plurality of air-lifts provided along the horizontal transfer path of said pressing mold in order to lift said pressing mold and transfer it by means of compressed air jetted out of said air-jetting holes of said air-lifts.

* * * * *